US009709350B2

(12) United States Patent
Gaiser et al.

(10) Patent No.: US 9,709,350 B2
(45) **Date of Patent: *Jul. 18, 2017**

(54) HEAT EXCHANGER

(71) Applicant: Eberspächer Exhaust Technology GmbH & Co. KG, Neunkirchen (DE)

(72) Inventors: Gerd Gaiser, Reutlingen (DE); Markus Birgler, Wernau (DE); Matthias Feuerbach, Esslingen (DE); Marc Hartmann, Rottenburg (DE); Jürgen Schweizer, Stuttgart (DE); Rouven Egger, Böblingen (DE); Dimitri Penner, Plochingen (DE); Fabian Frobenius, Esslingen (DE)

(73) Assignee: Eberspächer Exhaust Technology GmbH & Co. KG, Neunkirchen (DE)

(*) Notice: Subject to any disclaimer, the term of this patent is extended or adjusted under 35 U.S.C. 154(b) by 903 days.

This patent is subject to a terminal disclaimer.

(21) Appl. No.: 14/026,325

(22) Filed: Sep. 13, 2013

(65) Prior Publication Data

US 2014/0076292 A1 Mar. 20, 2014

(30) Foreign Application Priority Data

Sep. 14, 2012 (DE) ........................ 10 2012 216 448

(51) Int. Cl.
*F02M 25/07* (2006.01)
*F28F 27/00* (2006.01)
(Continued)

(52) U.S. Cl.
CPC .............. *F28F 27/00* (2013.01); *F01N 3/043* (2013.01); *F01N 5/02* (2013.01); *F02M 26/28* (2016.02);
(Continued)

(58) Field of Classification Search
CPC ...... F28F 27/00; F28F 1/24; F28F 1/36; F28F 2250/06; F28D 21/0003; F28D 7/024;
(Continued)

(56) References Cited

U.S. PATENT DOCUMENTS 1,343,669 A * 6/1920 Funderburk ............ F28D 7/024 165/163
2,508,247 A 5/1950 Giauque

FOREIGN PATENT DOCUMENTS

DE 10 2008 014 169 A1 1/2009
DE 10 2009 041 773 A1 5/2011
(Continued)

*Primary Examiner* — Hung Q Nguyen
(74) *Attorney, Agent, or Firm* — McGlew and Tuttle, P.C.

(57) ABSTRACT

A heat exchanger (5) includes a housing (31), which contains a tube (32) and has a jacket (33), which surrounds the tube (32) while forming a ring channel (34). A primary inlet (35) and a primary outlet (36) are connected to one another fluidically via a primary path (37) carrying a primary medium through ring channel (34) and via a bypass path (38) carrying the primary medium through the tube (32). A control device (39) controls the flow of the primary medium through the primary path (37) and the bypass path (38). A secondary inlet (42) and a secondary outlet (43) are connected to one another fluidically via at least two secondary paths (44) for carrying a secondary medium. The primary path (37) is coupled with the secondary paths (44) in a heat-transferring manner with the media separated from one another.

21 Claims, 12 Drawing Sheets

(51) Int. Cl.

| | |
|---|---|
| ***F01N 3/04*** | (2006.01) |
| ***F01N 5/02*** | (2006.01) |
| ***F28D 7/02*** | (2006.01) |
| ***F28F 1/36*** | (2006.01) |
| ***F28D 21/00*** | (2006.01) |
| ***F28F 1/24*** | (2006.01) |
| ***F02M 26/28*** | (2016.01) |
| ***F02M 26/32*** | (2016.01) |

(52) U.S. Cl.
CPC ............. *F02M 26/32* (2016.02); *F28D 7/024* (2013.01); *F28D 21/0003* (2013.01); *F28F 1/24* (2013.01); *F28F 1/36* (2013.01); *F01N 2240/02* (2013.01); *F01N 2240/36* (2013.01); *F01N 2410/00* (2013.01); *F28F 2250/06* (2013.01); *Y02T 10/16* (2013.01); *Y02T 10/20* (2013.01)

(58) Field of Classification Search
CPC ........ F01N 3/043; F01N 5/02; F01N 2240/02; F01N 2410/00; F01N 2240/36; Y02T 10/121; Y02T 10/16; Y02T 10/20
USPC ............................................ 60/320; 123/495
See application file for complete search history.

(56) References Cited

FOREIGN PATENT DOCUMENTS

| | | |
|---|---|---|
| JP | 2010-091 128 A | 4/2010 |
| WO | 2011/153 179 A1 | 12/2011 |

* cited by examiner 1
2
3
4
5
6
7
8
9
10
11
12
13
14
15
16
17
18
19
20
21
22
23
24
25
26
27
28
30
35
36
4; 23
10; 12
63
64
65
66
67
68
69
70

27
26
28
4; 23
4
23
11
9
18
17
36
14
12
25
24
35
15
16
5, 13
3
8
10
7
7
7
19
6
1
2
22
21
19
20

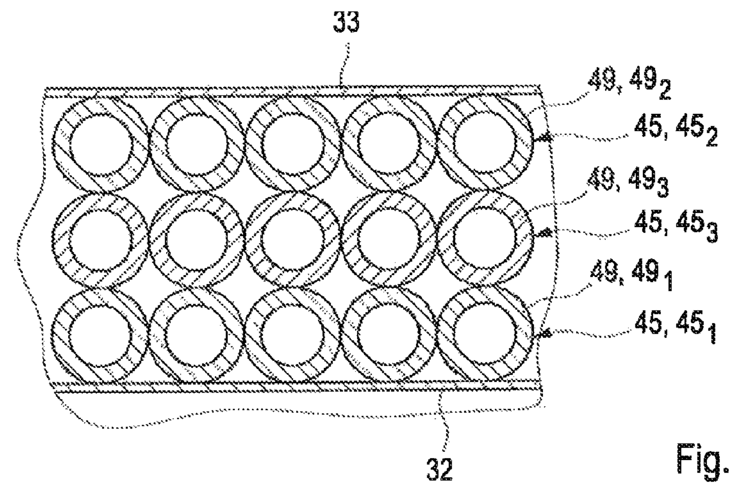
Fig. 5 a
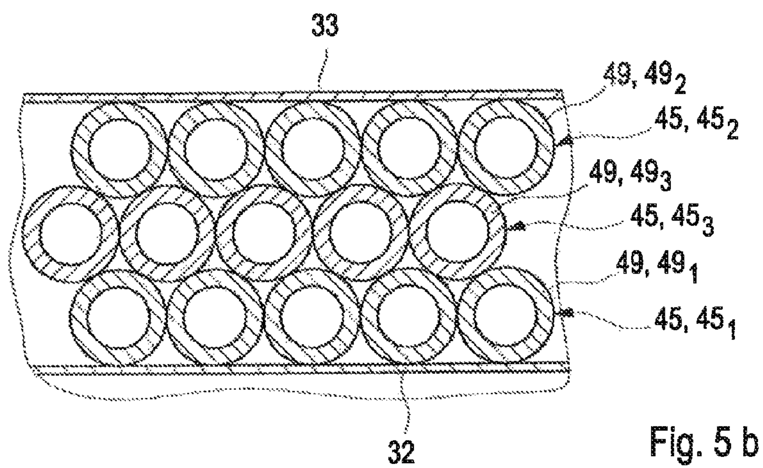
Fig. 5 b
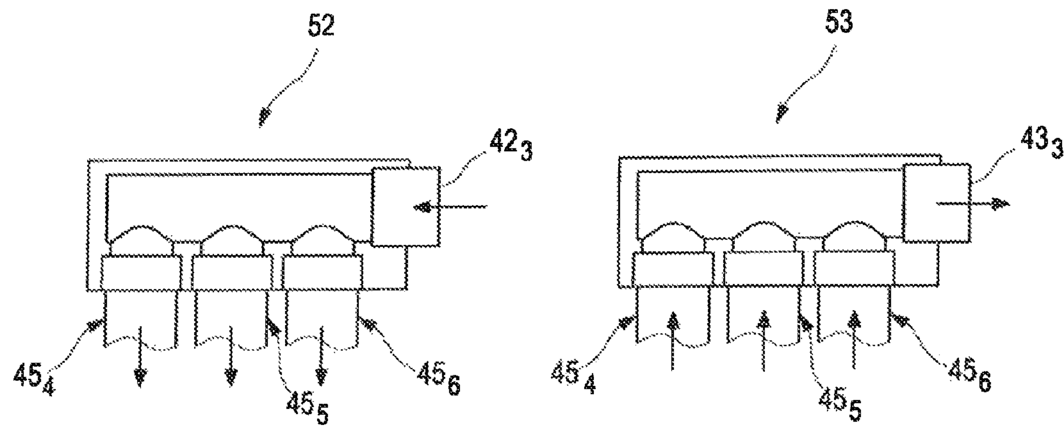
Fig. 6 a
Fig. 6 b

HEAT EXCHANGER

CROSS REFERENCE TO RELATED APPLICATIONS

This application claims the benefit of priority under 35 U.S.C. §119 of German Patent Application DE 10 2012 216 448.0 filed Sep. 14, 2012, the entire contents of which are incorporated herein by reference.

FIELD OF THE INVENTION

The present invention pertains to a heat exchanger as well as to a device that is equipped with such a heat exchanger.

BACKGROUND OF THE INVENTION

Heat exchangers, which make it possible to transfer heat between a first medium and a second medium, are used in various industrial fields and are generally known. Applications in vehicles are of particular significance, because the heat exchangers require a compact and inexpensive design for this. A plurality of heat exchangers may be used in motor vehicles, which have an internal combustion engine for driving the vehicle, for example, in one or more cooling circuits for cooling an engine block of the internal combustion engine, for cooling lubricating oil, for cooling charge air and for cooling recirculated exhaust gas.

Waste heat utilizing units, which operate in the manner of a Rankine cycle, preferably a Rankine-Clausius cycle, are known for making it possible to better utilize the heat container in the exhaust gas of the internal combustion engine, so that a working medium is evaporated, expanded, condensed and compressed, wherein the expansion of the compressed, evaporated and superheated working medium is used to generate mechanical energy, for example, in order to drive a generator for power generation. The evaporation of the working medium is performed here by means of an evaporator, which likewise corresponds to a heat exchanger. This heat exchanger or evaporator may be integrated, for example, in an exhaust system of the internal combustion engine in a suitable manner in order to transfer heat from the exhaust gas to the working medium for evaporating the working medium.

SUMMARY OF THE INVENTION

An object of the present invention is to propose an improved embodiment, which is characterized especially by efficient heat transfer along with compact design, for a heat exchanger of the above-described type or for a device equipped therewith.

According to the invention, a heat exchanger is provided with a housing, which contains a tube and has a jacket, which surrounds the tube while forming a ring channel. A primary inlet and a primary outlet are connected with one another fluidically via a primary path carrying a primary medium through the ring channel and via a bypass path carrying the primary medium through tube. A control device (control means) is provided. The control means is for controlling a flow of the primary medium through the primary path and through the bypass path. A secondary inlet and a secondary outlet are connected to one another fluidically via at least two secondary paths for carrying a secondary medium. The primary path is coupled with the secondary paths in a heat-transferring manner with the media separated.

The present invention is based on the general idea of providing for a secondary medium at least two separate secondary paths, which connect a common secondary inlet in parallel with a common secondary outlet fluidically with one another, in a heat exchanger, which has a primary path for a primary medium, which said primary path connects a primary inlet and a primary outlet with one another. By making available at least two secondary paths, through which the secondary medium can flow in parallel, and which are both coupled with the primary path in a heat-transferring manner in such a way that the media are separated, the flow resistance of the heat exchanger for the secondary medium can be reduced, so that, on the whole, a larger volume flow with sufficient residence time of the secondary medium in the heat exchanger can be achieved. On the whole, increased efficiency can be achieved hereby for the heat transfer between primary medium and secondary medium, which can at the same time lead to a compact design.

The heat exchanger thus created can be used especially advantageously as an evaporator to evaporate a working medium as a secondary medium. The heat exchanger can be connected for this, for example, into an exhaust gas-carrying line of an internal combustion engine, such that the exhaust gas forms the primary medium. Depending on the operating state of the internal combustion engine, the exhaust gas of an internal combustion engine may reach a very high temperature, so that a large quantity of heat can be removed from the exhaust gas by means of the heat exchanger being presented here for evaporating the working medium. This can be accomplished especially efficiently and with a compact design by means of the heat exchanger being presented here, because the secondary medium to be evaporated and the working medium flow through the at least two secondary paths in parallel, so that the heat can be absorbed in parallel.

To embody the heat exchanger according to a preferred embodiment, the present invention specifically proposes a kind of tubular construction, in which a housing contains a tube and has a jacket, which surrounds the tube while forming a ring channel. The primary path is led through the ring channel, while a bypass path, which likewise connects the primary inlet to the primary outlet while bypassing the ring channel, is led through the tube. Furthermore, a control means is provided, by means of which the flow of the primary medium through the primary path and the bypass path can be controlled. The at least two secondary paths are likewise led through the ring channel, such that they are coupled in the ring channel with the primary path such that the media are separated from each other and in a heat-transferring manner. The heat transfer between the primary medium and the secondary medium takes place exclusively in the ring channel due to this mode of construction, so that active heat transfer to the secondary medium takes place only if primary medium flows through the ring channel. Primary medium, which flows through the bypass path, bypasses this heat-transferring coupling between the primary path and the secondary path and can lead at best to a passive heat transfer to the secondary medium, which is based, e.g., on the heating of the housing by the exhaust gas stream. The primary medium can now be controlled by means of the control means, so that it flows either only through the primary path, i.e., through the ring channel, or only through the bypass path, i.e., through the tube. According to a preferred embodiment of the control means, it is also possible to set at least one intermediate position, in which the primary medium flows through both the primary path and the bypass path, as a result of which the quantity of heat that can be transferred to the second medium can be controlled. The tubular construction being presented here, in which the tube and the jacket have round cross sections and extend cylindrically, makes relatively high pressures possible on the primary side, as a result of which use of the heat exchanger on the primary side in the exhaust gas stream is facilitated.

The mode of construction of the heat exchanger being presented here is characterized by an extremely compact geometry and a design that can be embodied at a low cost.

The common housing may advantageously be designed such that it has only one common secondary inlet and only one common secondary outlet for the at least two secondary paths. As a consequence, the same secondary medium can be divided between the at least two secondary paths, so that it flows in parallel through the secondary paths. As a result, the cross section, through which flow is possible and is available, on the whole, for the secondary medium, can be increased significantly, as a result of which the flow resistance for the secondary medium and, along with this, a pressure loss during the flow through the heat exchanger can be reduced.

Corresponding to an advantageous embodiment, at least two coils can be provided, which are arranged in the ring channel, wind around the tube in a helical pattern and through which a secondary path each passes. The use of such coils leads to relatively long secondary paths for the secondary medium, as a result of which relatively long residence times can be obtained within the heat exchanger or within the ring channel, which is favorable for intensive heat transfer. Such coils can likewise be exposed to relatively high pressures both on the inside and on the outside, which simplifies the use of the heat exchanger on the primary side in an exhaust gas stream and on the secondary side, e.g., in a waste heat utilization circuit.

To improve the heat transfer between primary medium and secondary medium, each coil may have, according to an advantageous embodiment, a helical coil, which carries the secondary medium on the inside and carries cooling fins exposed to the primary medium on the outside. Such cooling fins may be embodied, for example, by means of a plurality of disk-shaped elements, which are pressed onto the coiled tubing or are soldered or welded thereto. Such cooling fins may also be embodied by means of at least one helical strip element, which envelops the respective spiral tube in a helical pattern.

According to another advantageous embodiment, the at least two coils may be arranged in the ring channel radially one over the another or on one another. The heat exchanger can be made extremely compact in the axial direction due to this mode of construction. Due to the coils being arranged radially one over the other or on one another, loops located on the inside are present, which belong to an inner coil or to an inner coil section and which are located at directly spaced locations from the tube, while other loops of another coil or of another coil section are arranged between these inner loops and the jacket. There also exist outer loops, which belong to an outer coil or to an outer coil section and which are directly adjacent to the jacket, while loops of another coil or of another coil section are arranged between these outer loops and the tube.

In case exactly two coils are provided, the inner loops are arranged directly adjacent to the tube and indirectly adjacent to the jacket via the outer loops, while the outer loops are arranged directly adjacent to the jacket and indirectly adjacent to the tube via the inner loops. In case of three or more coils, which are arranged radially one over the other or on one another, there exist, additionally to the inner loops and to the outer loops, further intermediate loops, which are arranged in at least one intermediate layer, which is located between the inner loops and the outer loops.

According to an advantageous variant, the at least two coils may form each at least two axially adjacent coil bundles, in which a coil section comprising a plurality of loops extends from each coil. A radial position of the loops of the respective coil section is the same within the same coil bundle. However, the radial positions of the loops of the same coils are different in the adjacent coil bundles. In an embodiment with only two coils, this means, for example, that at least two axially adjacent coil bundles are present, in which two coil sections each are arranged radially one on top of another. The inner loops form a first coil section of the first coil within the first coil bundle, while the outer loops form a first coil section of the second coil. By contrast, the inner loops form a second coil section of the second coil in the second coil bundle, while the outer loops form a second coil section of the first coil. Thus, each coil has an inner coil section with inner loops and an outer coil section with outer loops. The radial positions of the loops of the same coil are thus varied from one coil bundle to the next coil bundle. On the whole, homogenization of the heat transfer from the primary medium to the secondary medium can be achieved due to this mode of construction. This mode of construction is based on the discovery that a coil located farther outside embodies a longer secondary path than a coil located farther inside in case of coils arranged radially one over the other, as a result of which the secondary medium will have different residence times in the heat exchanger, which leads to differences in heat absorption by the different secondary paths. The heat absorption of the different secondary paths can be homogenized by changing the radial positions of the loops, which belong to the same coil and hence to the same secondary path.

Especially advantageous is in this connection an embodiment in which if n corresponds to the number of coils, at least n coil bundles are provided, in which n different radial positions each are possible for the loops, wherein the loops of the coil sections assume in each coil every possible radial position at least once. This means that in case of exactly three coils, i.e., in case of exactly three secondary paths, at least three coil bundles are provided, in which exactly three different radial positions each are possible for the loops, namely, inner loops, outer loops and centrally arranged loops. Furthermore, this means that at least one coil section with inner loops, one coil section with outer loops, and one coil section with centrally arranged loops are provided in the at least three coil bundles in each of these three coils.

In another advantageous variant, one connection tube may be provided per coil between adjacent coil bundles, where said connection tube fluidically connects a coil section of one coil bundle, which said coil section is located farther inside, with a coil section of the other coil bundle, which latter coil section is located farther outside. It is possible hereby, in principle, for the individual coil bundles to have an identical design to be connected to one another by means of the connection tubes such that the aforementioned arrangement is obtained, in which the individual wave sections of the same radial position belong to different coils in adjacent wave bundles.

To make it possible to connect these connection tubes fluidically to the spiral tubes in an especially simple manner, connecting sleeves may be provided, in which end sections of the spiral tubes and of the connection tubes can be plugged axially. In particular, such connecting sleeves can be simply soldered to the connection tubes and the spiral tubes.

The at least two coils may differ from one another by different heat transfer capacities according to another advantageous embodiment, which may be embodied in addition or as an alternative to the above variants. It is possible as a result to more or less compensate differences in heat transfer between a coil located farther inside or a coil section located farther inside and a coil located farther outside or a coil section located farther outside.

For example, the coils may differ from one another by different cross sections through which flow is possible. In particular, the spiral tubes used have different flow cross sections. For example, a coil located farther outside may have a larger cross section through which flow is possible than a coil located farther inside.

Provisions may be made in addition or as an alternative for the coils to differ from each other by the number of loops. The number of loops defines the length of the corresponding secondary path, so that coils with secondary paths having different lengths can be embodied as a result, For example, a coil located farther outside may have a smaller number of loops than a coil located farther on the inside. This also applies analogously to coil sections within one coil bundle.

Provisions made be made, in addition or as an alternative, for coils that have a spiral tube with cooling fins for the coils to differ from one another by a different size of the cooling fins and/or by a different density in which the cooling fins are arranged and/or by a different geometry of the cooling fins and/or by different materials used for the cooling fins. A different density with which the cooling fins are arranged corresponds to a different number of cooling fins per unit of length of the spiral tube. Different materials of the cooling fins and/or of the spiral tubes differ by different coefficients of thermal conduction. The different shapes and/or arrangements of the cooling fins significantly affect the heat transfer capacity of the corresponding coil, so that the desired homogenization can be achieved on this basis in an especially simple manner.

Furthermore, provisions may generally be made, in addition or as an alternative, for the coils to differ from each other by their materials. The different materials are characterized especially by different coefficients of thermal conduction.

All coils may be arranged radially one over the other in a special embodiment, so that axially adjacent loops belong to the same coil within the respective radial position. In particular, the aforementioned coil bundles can be embodied hereby in an especially simple manner.

By contrast, provisions may be made in another embodiment for at least two coils to be arranged intertwining axially one in another in the manner of a double coil or multiple coil at least in a position located radially farther on the outside, so that loops of different coils are arranged axially next to each other within this radial position. Due to the use of at least two coils in a position located radially farther on the outside, the number of loops can be reduced there at least by half compared to a single coil, as a result of which the length of the corresponding secondary path can be reduced correspondingly as well.

Provisions may be made in another advantageous embodiment for at least two coils to be arranged in the ring channel axially intertwined in one another in the manner of a double coil or multiple coil, so that loops of different coils are arranged axially next to each other. This measure causes at least two coils within the same radial position to extend in parallel to one another, as a result of which uniform heat transfer to the secondary medium becomes established.

Preferred is here a variant in which all coils in the ring channel are arranged axially in one another, so that the loops of all coils are located on the same radial position. All loops are arranged directly adjacent to both the tube and the jacket in this case.

Depending on the conditions of use, iron alloys, preferably steel, especially stainless steel, are preferably used as the materials for the housing, especially the tube and the jacket, as well as for the coils, especially for the corresponding spiral tube and for the cooling fins. Furthermore, light metals or light metal alloys, e.g., aluminum or aluminum alloys, may be used as well. Copper or a copper alloy may also be used as an alternative. For protection against corrosive exhaust gas, the surfaces exposed to the exhaust gas may also be provided with a protective coating, especially a ceramic protective coating. Coils made of copper may preferably be provided with such a protective coating on the outside.

A device according to the present invention, which may be arranged especially in a vehicle, namely, either in a land craft and in a watercraft or in an aircraft, comprises an internal combustion engine, which has a fresh air feed unit for feeding fresh air to the combustion chambers of the internal combustion engine and an exhaust system for removing exhaust gas from the combustion chambers as well as optionally an exhaust gas-recirculating unit for recirculating exhaust gas from the exhaust system to the fresh air feed unit. Furthermore, such a device may be equipped with a waste heat utilization unit, which has, in a waste heat utilization circuit, in which a working medium circulates, an evaporator for evaporating the working medium, an expansion machine for expanding the working medium downstream therefrom, a condenser for condensing the working medium downstream therefrom, and a feed means for driving the working medium in the waste heat utilization circuit downstream therefrom. In addition or as an alternative to such a waste heat utilization unit, the device may be equipped with at least one cooling circuit, in which a cooling medium circulates and which may be used, for example, to cool the internal combustion engine. Finally, such a device is equipped with at least one heat exchanger of the above-described type. This heat exchanger is integrated in the device such that the primary path is integrated into the exhaust system or into the exhaust gas recirculating unit, so that the exhaust gas or the recirculated exhaust gas forms the primary medium. The secondary paths may, by contrast, be integrated into the waste heat utilization circuit, such that the working medium forms the secondary medium. As an alternative, the secondary paths may also be integrated into the cooling circuit, such that the cooling medium forms the secondary medium. Especially efficient utilization or recovery of the heat being carried in the exhaust gas or in the recirculated exhaust gas can be achieved in this device by means of the heat exchanger being shown here. If the heat exchanger is used on the secondary side in the waste heat utilization circuit, the heat exchanger operates as an evaporator, whereas it operates as a cooler in case of a secondary-side use in the cooling circuit. In case the heat exchanger is used as a cooler, it is used on the primary side preferably in the exhaust gas recirculating unit in order to efficiently bring about the desired cooling of the recirculated exhaust gas.

In case of a heat-transferring coupling of the exhaust gas recirculation with the waste heat utilization circuit by means of such a heat exchanger, an engine cooling circuit, which is used to cool a conventional exhaust gas recirculating cooler, can be considerably relieved. It is no longer necessary for the engine cooling circuit to absorb the total quantity of energy that can be removed from the exhaust gas via the heat exchanger acting as an evaporator.

It is possible, furthermore, to equip the device with at least two such heat exchangers, wherein one may now be arranged on the primary side in the exhaust system and the other may now be arranged on the primary side in the exhaust gas recirculating unit. The two heat exchangers may be connected on the secondary side independently from one another. It is also conceivable to connect the two heat exchangers in series on the secondary side, e.g., in order to evaporate the working medium of the waste heat utilization circuit in the heat exchanger through which flow took place first and to superheat it in the heat exchanger through which flow takes place next.

It is apparent that the features mentioned above, which will also be explained below, can be used not only in the particular combination indicated but in other combinations or alone as well, without going beyond the scope of the present invention.

Preferred exemplary embodiments of the present invention are shown in the drawings and will be explained in more detail in the following description, where identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5*a* is an enlarged detail view in the longitudinal section of the heat exchanger in the area of a plurality of coils arranged radially one over the other in one of various embodiments;

FIG. 5*b* is an enlarged detail view in the longitudinal section of the heat exchanger in the area of a plurality of coils arranged radially one over the other in another of various embodiments;

FIG. 6*a* is a simplified sectional views of a distributor element;

FIG. 6*b* is a simplified sectional views of a collection element;

DESCRIPTION OF THE PREFERRED EMBODIMENTS

Figure 1:
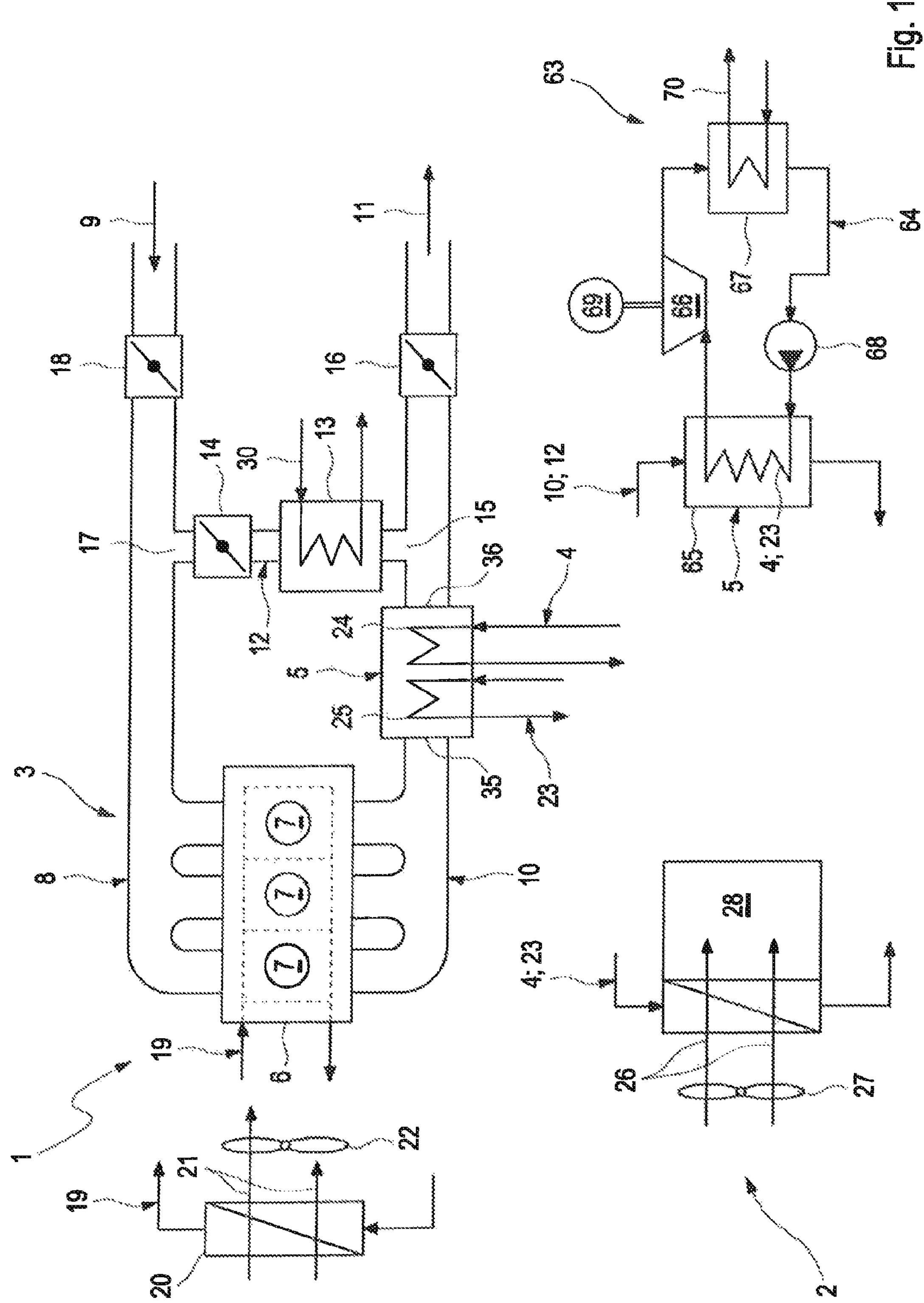
FIG. 1 is a highly simplified, block diagram-like, schematic views of a vehicle with a device having a heat exchanger showing one of various embodiments.
Figure 2:
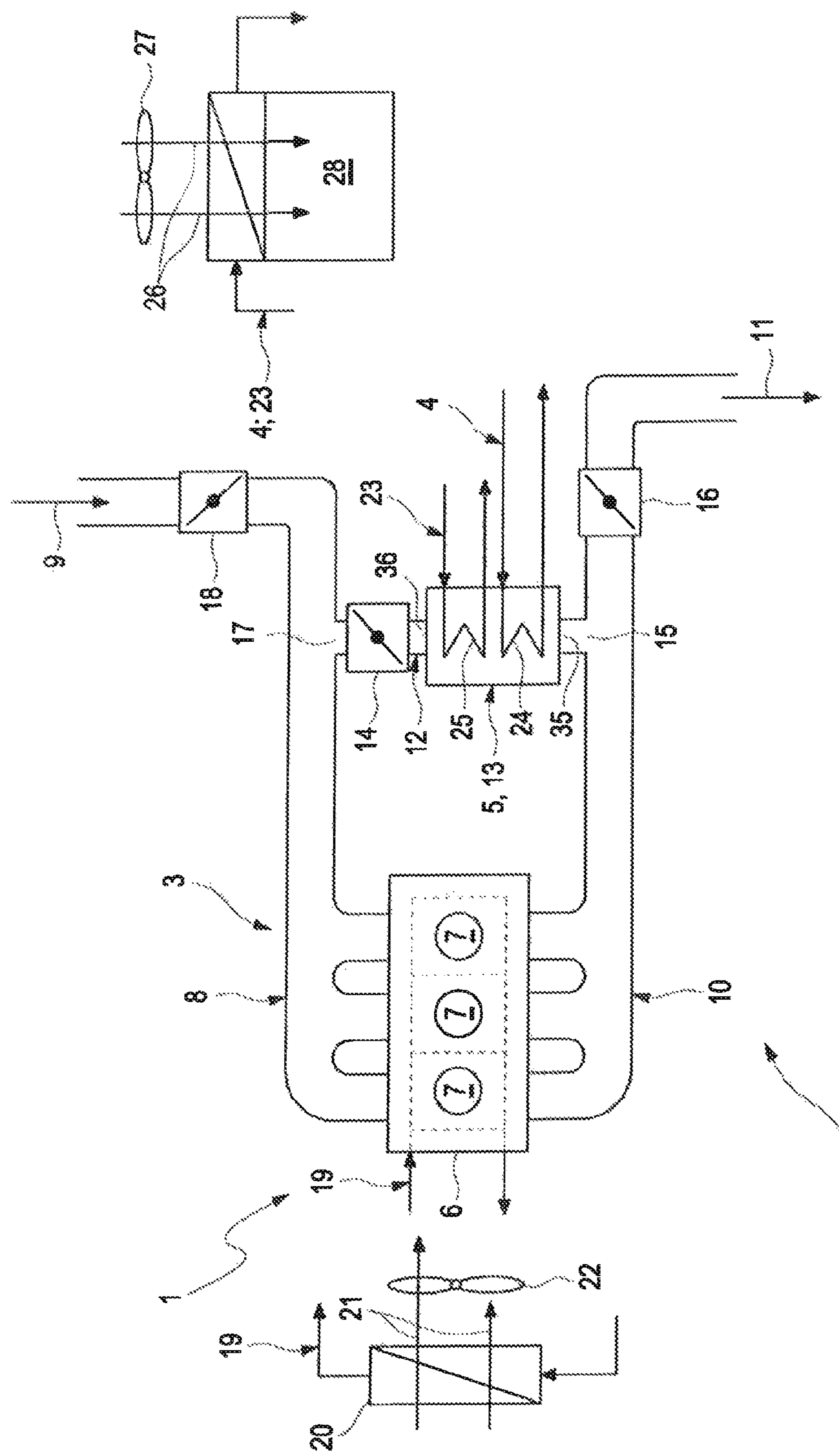
FIG. 2 is a highly simplified, block diagram-like, schematic views of a vehicle with a device having a heat exchanger showing another of various embodiments.

Referring to the drawings in particular, corresponding to FIGS. 1 and 2, a vehicle 1, which is preferably a land craft, especially a road vehicle, but which may also be a watercraft or an aircraft, may have a device 2, which comprises an internal combustion engine 3 as well as a waste heat utilization unit 4 and a heat exchanger 5.

The internal combustion engine 3 has an engine block 6, which contains a plurality of combustion chambers 7, which are formed in cylinders and in which pistons are arranged in such a way that they are adjustable by their stroke. The internal combustion engine 3 comprises, furthermore, a fresh air feed unit 8 for feeding fresh air to the combustion chambers 7. A corresponding fresh air stream is indicated by an arrow 9. The internal combustion engine 3 is equipped, besides, with an exhaust system 10 for removing exhaust gas from the combustion chambers 7. A corresponding exhaust gas stream is indicated by an arrow 11. The internal combustion engine 3 is equipped, moreover, in the embodiments being shown here with an exhaust gas-recirculating unit 12, which is used to recirculate exhaust gas from the exhaust system 10 to the fresh air feed unit 8. The exhaust gas-recirculating unit 12 contains an exhaust gas recirculating cooler 13 for cooling the recirculated exhaust gas as well as an exhaust gas recirculating valve 14 for controlling the quantity of recirculated exhaust gas, i.e., for setting an exhaust gas recirculation rate. To improve the exhaust gas recirculation, the exhaust system 10 may have a dynamic pressure valve 16 downstream of a connection site 15, in which the exhaust gas-recirculating unit 12 is connected to the exhaust system 10. The fresh air feed unit 8 may have a throttle valve 18 upstream of a connection site 17, in which the exhaust gas-recirculating unit 12 is connected to the fresh air feed unit 8.

For cooling the engine block 6, the internal combustion engine 3 has an engine cooling circuit 19, which is passed through the engine block 6 corresponding to broken lines and which contains a cooler 20. A cooling air stream 21, which is generated by the so-called relative wind during travel and which may also be generated or intensified by means of a blower 22, may be admitted to cooler 20 and said cooling air stream may flow through said cooler.

The waste heat utilization unit 4 comprises a waste heat utilization circuit 23, in which a working medium circulates. The waste heat utilization unit 4 preferably operates according to a Rankine-Clausius cycle and correspondingly contains in its waste heat utilization circuit 23, following one another in the direction of flow of the working medium, an evaporator 24, an expansion engine 25, a condenser 26 and a feed means 27. Evaporator 24 is used to evaporate the working medium. The expansion engine 25 s used to expand the evaporated and preferably superheated working medium, while the expansion engine 25 converts heat and pressure into mechanical work, for example, in order to drive a generator 28. Generator 28 generates electrical energy, which can be stored, for example, in a suitable energy storage means, preferably a battery. The expanded working medium can be condensed in condenser 26. Condenser 26 is connected for this purpose to a cooling circuit 29, which may be integrated especially in the engine cooling circuit 19. The feed means 27 drives the working medium in the waste heat utilization circuit 23. At the same time, feed means 27 can admit a comparatively high pressure to the liquid working medium.

In the embodiment shown in FIG. 1, heat exchanger 5 forms the evaporator 24, so that the exhaust gas forms a primary medium, which flows through the heat exchanger 5. The working medium of the waste heat utilization circuit 23 forms a secondary medium here, which flows through the heat exchanger 5 and is coupled therein with the primary medium, i.e., with the exhaust gas, in a heat-transferring manner and in such a way that the media are separated from each other. Furthermore, the exhaust gas recirculating cooling 13 is connected in the embodiment shown in FIG. 1 to a cooling circuit 30, which may be integrated in the engine cooling circuit 19.

Contrary to this, FIG. 2 shows an embodiment in which the heat exchanger 5 is integrated into the exhaust gas recirculating unit 12, such that the heat exchanger 5 forms the exhaust gas recirculation cooler 13 in the exhaust gas recirculating unit 12 and the evaporator 24 in the waste heat utilization unit 4. The primary medium of the heat exchanger 5 is thus formed by the recirculated exhaust gas in this case, while the secondary medium of the heat exchanger 5 is again formed by the working medium. In another embodiment, another heat exchanger, which operates as a residual cooler or as an additional exhaust gas recirculation cooler, may be arranged downstream of the heat exchanger 5 in order to cool the exhaust gas to the desired target temperature. This may be necessary when the temperature level of the waste heat utilization circuit 23 is above the target temperature of the recirculated exhaust gas.

Corresponding to FIGS. 3, 4, 8 through 10, 13 and 15, heat exchanger 5 comprises a housing 31, which contains a tube 32 and a jacket 33. Jacket 33 surrounds the tube 32 at a radially spaced location therefrom, so that a ring channel 34 is formed radially between tube 32 and jacket 33. A primary inlet 35 and a primary outlet 36 are formed on housing 31. Furthermore, housing 31 contains a primary path 37, which fluidically connects the primary inlet 35 and the primary outlet 36 with one another and which carries a primary medium, for example, the exhaust gas of the internal combustion engine 3 according to the embodiment shown in FIG. 1 or the recirculated exhaust gas according to the embodiment shown in FIG. 2, through ring channel 34. Ring channel 34 thus defines the primary path 37. Contrary to this, tube 32 defines a bypass path 38, which likewise connects the primary inlet 35 with the primary outlet 36 fluidically and which carries the primary medium through tube 32.

Figure 3:
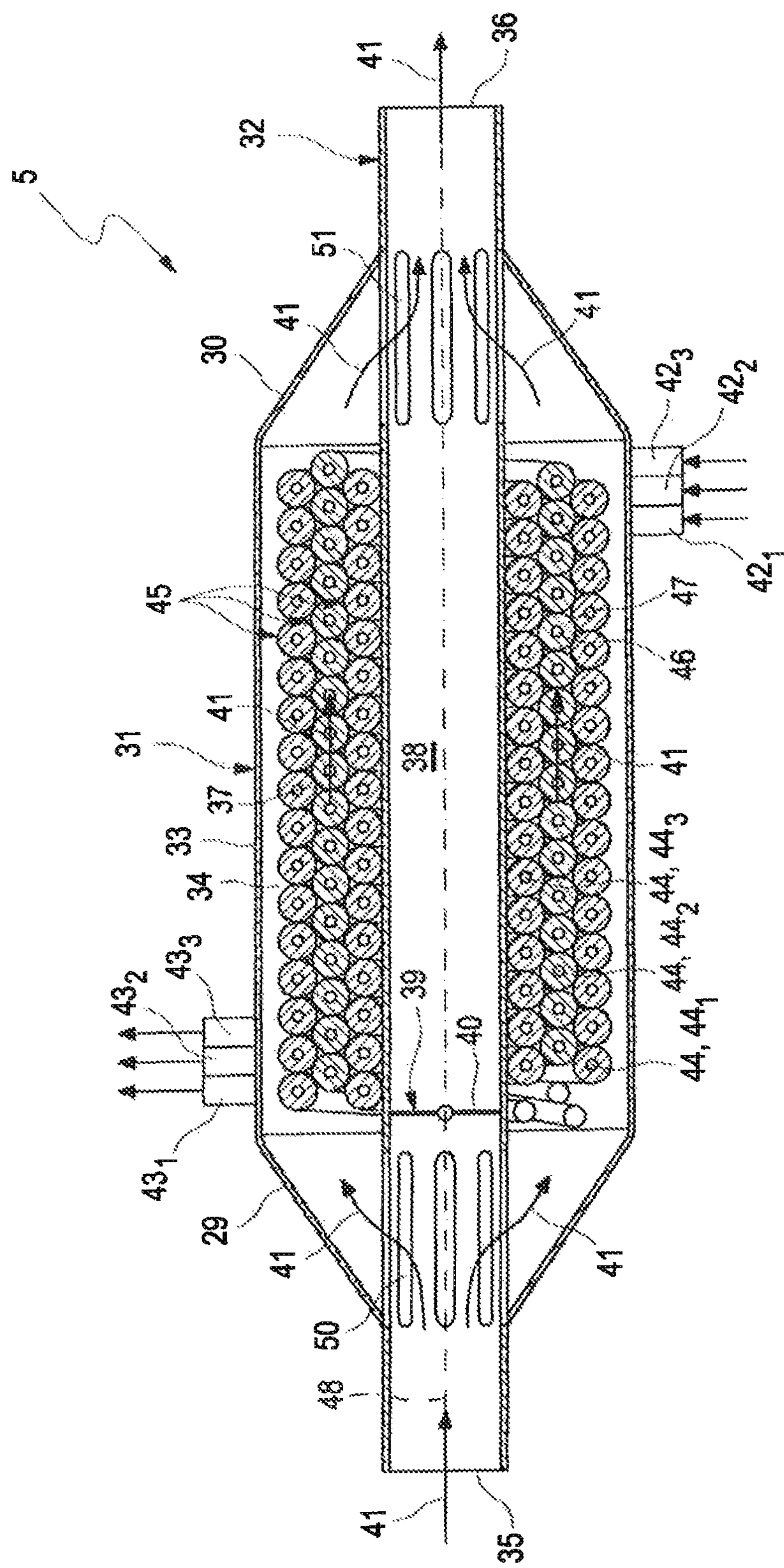
FIG. 3 is a highly simplified longitudinal sectional view through the heat exchanger, shown in one of different operating states.
Figure 4:
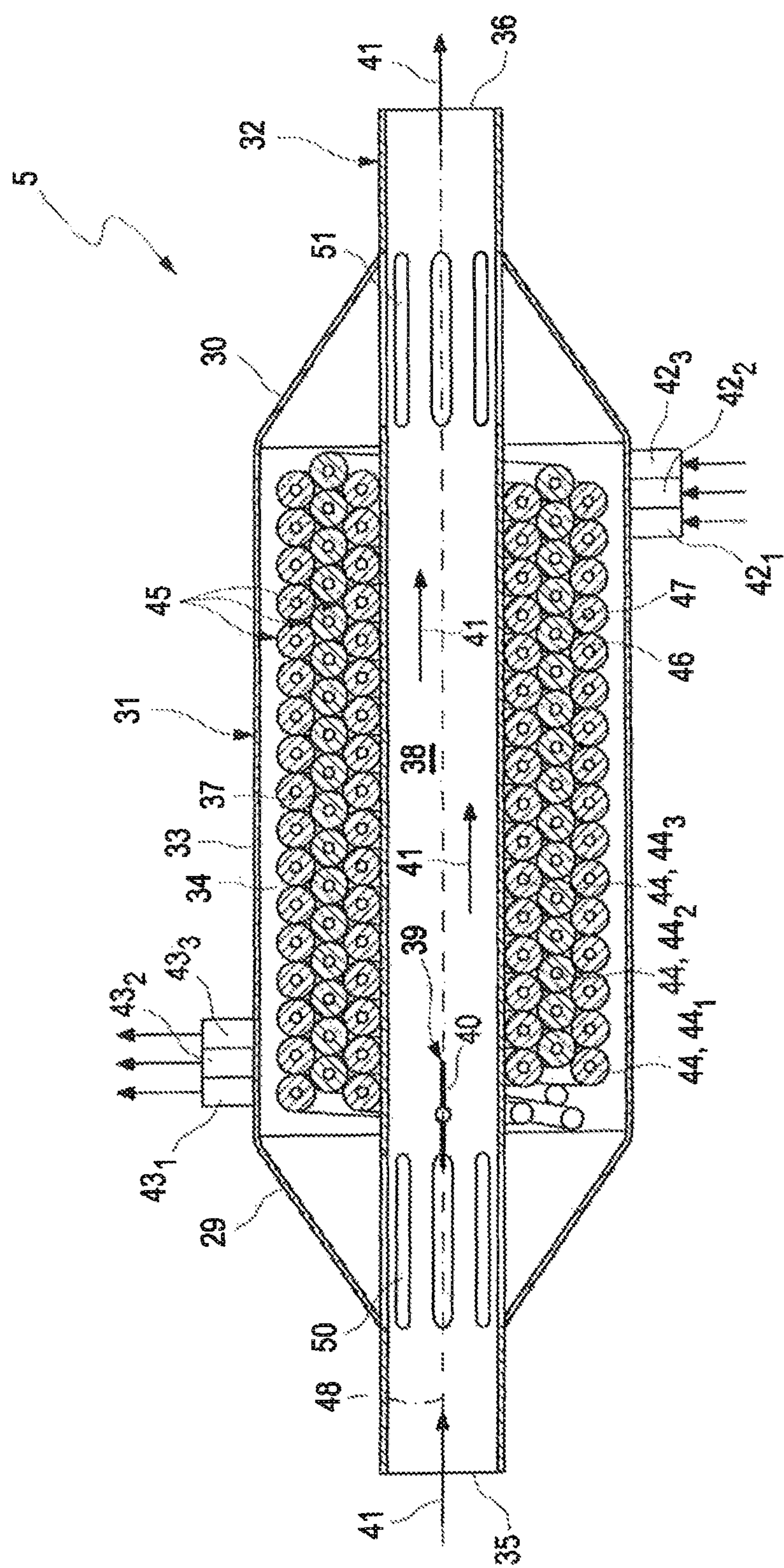
FIG. 4 is a highly simplified longitudinal sectional view through the heat exchanger, shown in another of different operating states.

In addition, heat exchanger 5 is equipped with a control means 39, by means of which the flow of the primary medium through the primary path 37 and the bypass path 38 can be controlled. For example, control means 39 comprises for this a control element 40, preferably a flap, which is arranged in tube 32 and by means of which a cross section of tube 32, through which cross section flow is possible, can be changed. For example, FIG. 3 shows a closed position of adjusting member 40, in which the cross section of tube 32, through which cross section flow is possible, is extensively closed, so that the exhaust gas follows the primary path 37 according to arrows 41 and flows through the ring channel 34. Contrary to this, FIG. 4 shows a state in which the adjusting member 40 is adjusted into an open position, in which it releases the cross section of tube 32, through which cross section flow is possible. Since tube 32 has a markedly lower flow resistance than ring channel 34, the exhaust gas flows in this case corresponding to arrows 41 almost exclusively through tube 32 and correspondingly follows bypass path 38. The adjusting member 40 is always indicated in FIGS. 8 through 10, 13 and 15 by solid lines in its closed position, whereas an interrupted line indicates the open position of adjusting member 40. It is clear that the control means 39 may also set at least one intermediate position, preferably any desired intermediate positions, in order to set a desired flow division between the primary path 37 and the bypass path 38 depending on the needs.

Heat exchanger 5 is equipped, besides, with a secondary inlet 42 and a secondary outlet 43, which are fluidically connected with one another via a plurality of secondary paths 44, with the secondary paths 44 carrying a secondary medium. The secondary medium is formed by the working medium of the waste heat utilization circuit 4 in the examples shown in FIGS. 1 and 2. The secondary paths 44 are likewise led through the ring channel 34, such that a heat-transferring coupling with separated media is obtained between the primary path 37 and the secondary paths 44.

According to FIGS. 3 through 15, the secondary paths 44 are formed by means of at least two coils 45. These coils 45 are arranged in the ring channel 34 and wind around tube 32 in a helical pattern. Each coil 45 carries a secondary path 44. The coils 45 are formed here by means of a spiral tube 46 each, which extends helically and which carries the secondary medium on the inside, i.e., contains the corresponding secondary path 44, and carries cooling fins 47, which are exposed to the primary medium, on the outside.

FIGS. 3 through 9 show embodiments in which at least two coils 45 are arranged in ring channel 34 radially one over another. The radial direction is related to a longitudinal axis 48 of the straight jacket 33 or of the straight tube 32. Tube 32 and jacket 33 are advantageously of a cylindrical shape. Tube 32 and jacket 33 may have a round cross section, which may be circular or oval or elliptical, in all embodiments.

The individual coils 45 have a plurality of loops, which wind around tube 32 and which are designated by 49 in FIGS. 5*a* and 5*b*. Due to the coils 45 being arranged radially one over the other, there are, according to FIGS. 5*a* and 5*b*, inner loops $\mathbf{49}_1$ of an inner coil $\mathbf{45}_1$, which are directly adjacent to tube 32. Furthermore, there are outer loops $\mathbf{49}_2$ of an outer coil $\mathbf{45}_2$, which are directly adjacent to jacket 33. Insofar as more than two coils are provided, as in the embodiments being shown here, there also exists at least one middle coil $\mathbf{45}_3$, which have middle loops $\mathbf{49}_3$, which are adjacent to both the tube 32 and the jacket 33 only indirectly, namely, always via an inner loop $\mathbf{49}_1$ and an outer loop $\mathbf{49}_2$.

According to FIG. 5*a*, the radially adjacent coils 45 may be arranged radially flush in respect to their loops 49. A more compact mode of construction is obtained according to FIG. 5*b* if the radially adjacent coils 45 are arranged axially offset in relation to one another by half the loop cross section.

In order for the primary medium to be able to be divided quasi as desired between the primary path 37 and the bypass path 38 depending on the position of the control element 40, tube 32 is designed as a continuous tube in the embodiments being shown here, so that it is connected directly to the primary inlet 35 and the primary outlet 36 and forms same. Tube 32 has, furthermore, a perforated, here slotted inlet area 50 and a perforated, here slotted outlet area 51, as a result of which a fluidic connection is created between tube 32 and ring channel 34. The inlet area 50 is located upstream of the coils 45, while the outlet area 51 is located downstream of the coils 45. With the control element 40 open, the flow resistance of the ring channel 34 is so high due to the coils 45 arranged in ring channel 34 that the primary medium flows almost exclusively through tube 32, which has a markedly lower flow resistance.

Figure 15:
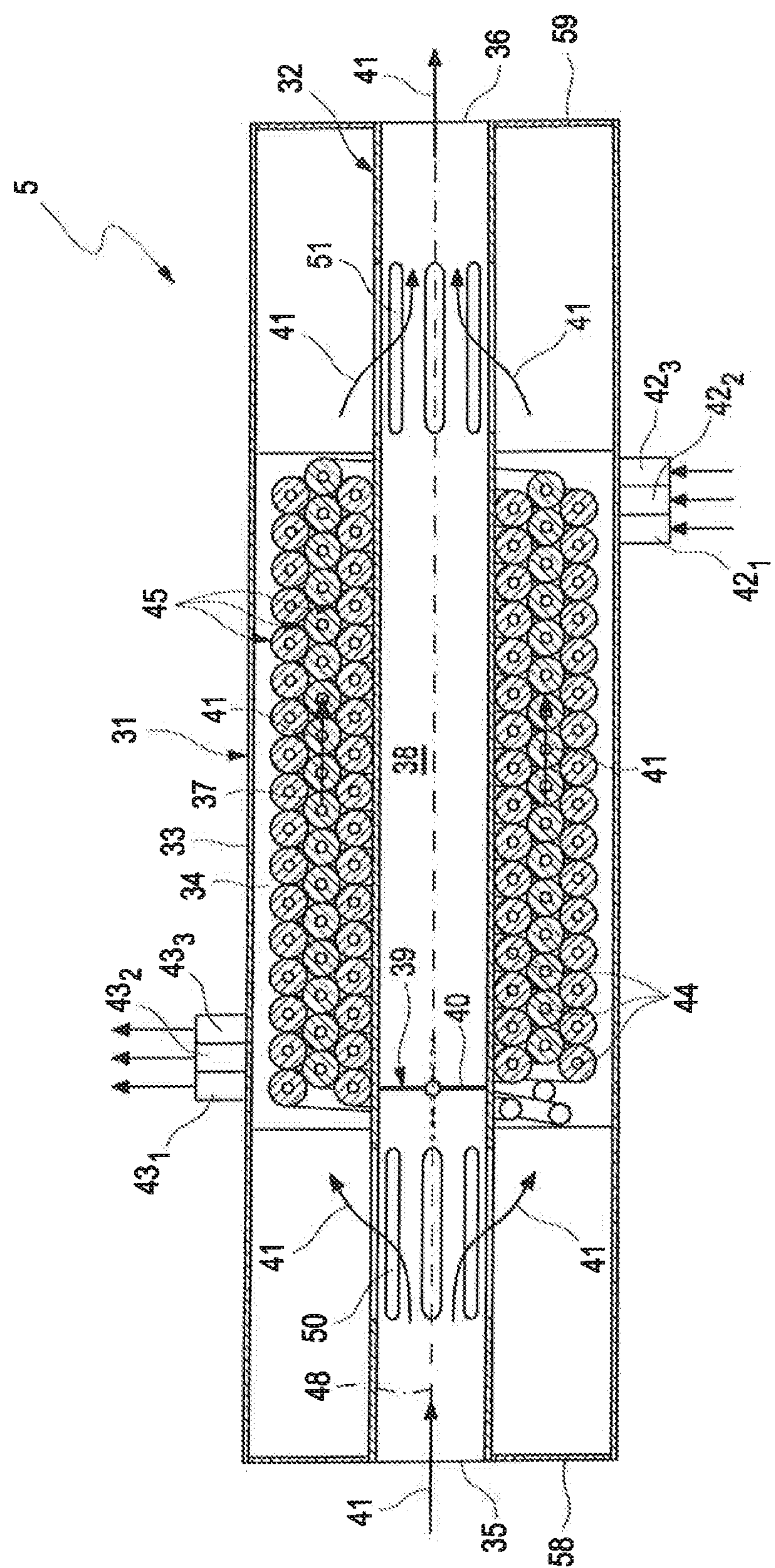
FIG. 15 is a simplified longitudinal sectional view of the heat exchanger in another embodiment.

In the examples shown in FIGS. 3, 4, 8 through 10 and 13, housing 31 has an inlet funnel 58, which forms the inlet-side transition from tube 32 to jacket 33 and in which the perforated inlet area 50 is located, as well as an outlet funnel 59, which forms the outlet-side transition from tube 32 to jacket 33 and in which the perforated outlet area 51 is located. Contrary to this, FIG. 15 shows an embodiment that has an inlet-side end bottom 60 or inlet end bottom 60 instead of the inlet funnel 58 and an outlet-side end bottom 61 or outlet end bottom 61, which define front-side ends of housing 31 and which are fastened to jacket 33, for example, by means of beading, instead of the outlet funnel 59. Jacket 33 and tube 32 are connected directly to one another in this case. Jacket 33 covers both the gas-permeable inlet area 50 and the gas-permeable outlet area 51 in the axial direction in this case.

In order for the secondary fluid to be able to flow in parallel through the individual coils 45, a distributor element 52 may be provided according to FIG. 6*a*, which is connected to the secondary inlet 42 on the inlet side and to the coils 45 on the outlet side. Analogously to this, a collection element 53 may be provided according to FIG. 6*a*, which is connected to the coils 45 on the inlet side and to the secondary outlet 43 on the outlet side. Distributor element 52 and collection element 53 may have, in principle, a similar and preferably identical design.

Such a distributor element 52 may be arranged in the interior of housing 31 and connected to the outer secondary inlet 42. It is likewise possible to arrange such a distributor element 52 on the outside on housing 31, so that it directly forms the secondary inlet 42. This also applies analogously to the collection element 53, which is arranged either in the interior of housing 31 and is connected to the secondary outlet 43 arranged on housing 31 on the outside, or which is arranged on housing 31 on the outside and forms the secondary outlet 43 itself.

Figure 7:
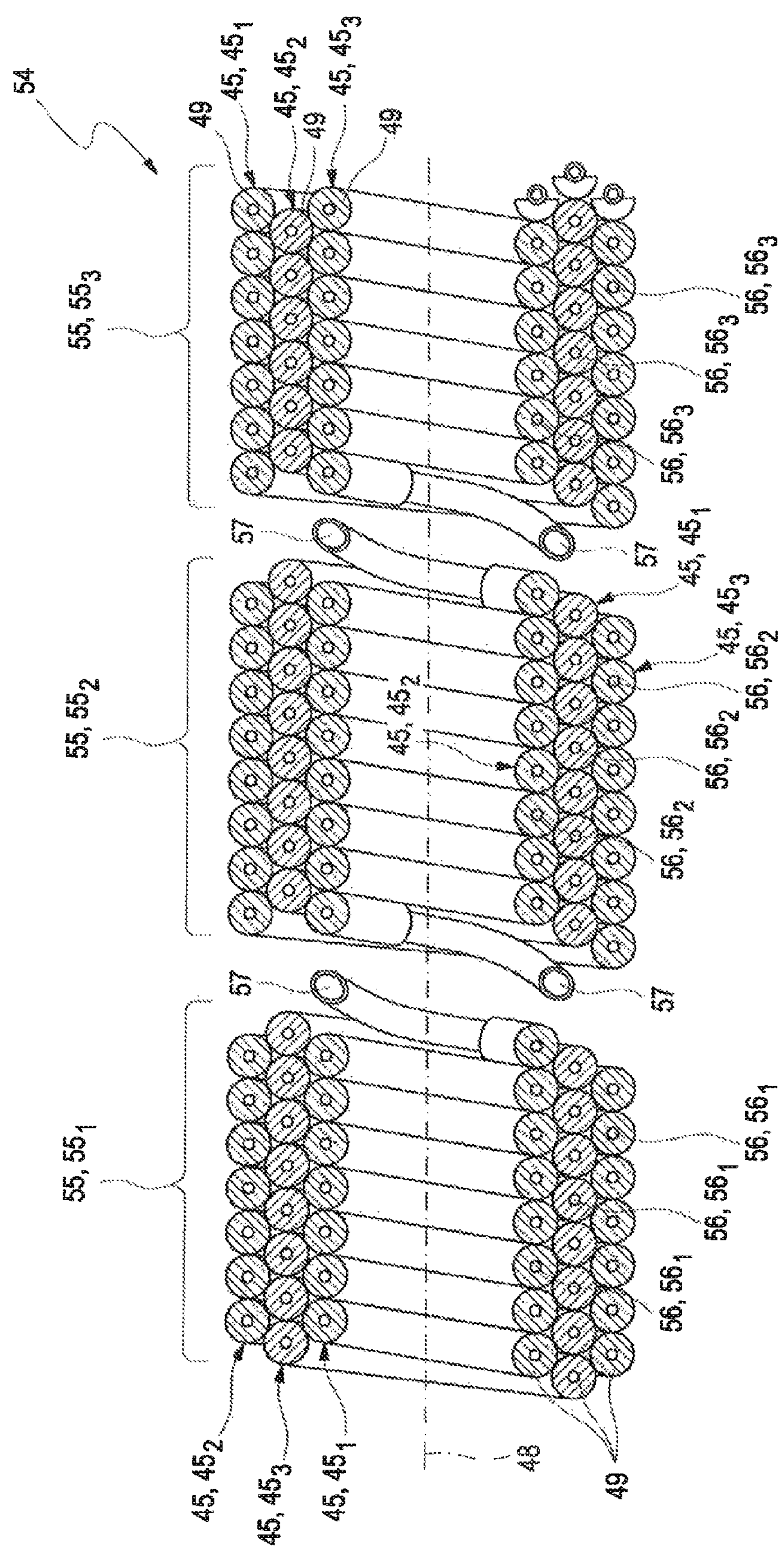
FIG. 7 is a simplified longitudinal sectional view through a coil array with a plurality of coil bundles.

FIG. 7 shows a coil array 54 without tube 32 and without jacket 33, as it can be embodied in the rink channel 34 of another embodiment of the heat exchanger 5. The coil array 54 comprises here three coils 45, namely, a first coil $\mathbf{45}_1$, a second coil $\mathbf{45}_2$ and a third coil $\mathbf{45}_3$. The coils 45 form three axially adjacent coil bundles 55, namely, a first coil bundle $\mathbf{55}_1$, a second coil bundle $\mathbf{55}_2$ and a third coil bundle $\mathbf{55}_3$. The axial direction is again defined by the longitudinal axis 48 of housing 31. Within each coil bundle 55, a coil section 56, which comprises a plurality of loops 49, extends from each coil 45. A total of three different radial positions, namely, a radially inner position, a radially outer position as well as a middle position, which is located radially between the inner and outer positions, are obtained for the loops 49 due to the globally three-layer arrangement of the coils 45 and of the coil sections 56. The radial position of the corresponding loops 49 within the same coil bundle 55 is the same within the corresponding coil section 56. The radial positions of the loops 49 of the same coils 45 are different for this in the different coil bundles 55.

A first coil section $\mathbf{56}_1$ of the first coil $\mathbf{45}_1$ is arranged radially inside in the first coil bundle $\mathbf{55}_1$ (shown on the left in FIG. 7) in the example shown in FIG. 7, so that all loops 49 of this first coil section $\mathbf{56}_1$ assume the inner position. The loops 49 are located on the outside in the first coil section $\mathbf{56}_1$ of the second coil $\mathbf{45}_2$ and thus assume the outer position. The loops 49 in the first coil section $\mathbf{56}_1$ are in the middle position in the third coil $\mathbf{45}_3$. The three coils 45 in the first coil bundle $\mathbf{55}_1$ thus always have a first coil section $\mathbf{56}_1$, within which the corresponding loops 49 are always located axially next to one another and are arranged within the same radial position.

The radial positions of the second coil sections $\mathbf{56}_2$ are changed now in the second coil bundle $\mathbf{55}_2$ (shown in the center in FIG. 7). The second coil section $\mathbf{56}_2$ of the first coil $\mathbf{45}_1$ is thus located now in the middle position. The second coil section $\mathbf{56}_2$ of the second coil $\mathbf{45}_2$ is located now in the inner position and the second coil section $\mathbf{56}_2$ of the third coil $\mathbf{45}_3$ is located now in the outer position.

The radial positions of the corresponding third coil sections $\mathbf{56}_3$ are transposed once again in the third coil bundle $\mathbf{55}_3$ (shown on the right side in FIG. 7). Thus, the third coil section $\mathbf{56}_3$ of the first coil $\mathbf{45}_1$ is located now in the outer position. The third coil section $\mathbf{56}_3$ of the second coil $\mathbf{45}_2$ is located now in the middle position, and the third coil section $\mathbf{56}_3$ of the third coil $\mathbf{45}_3$ is located now in the inner position.

According to FIG. 7, a connection tube 57 each may be provided per coil 45 between adjacent coil bundles 55, and said connection tube 57 fluidically connects a coil section 56 of one coil bundle 55, which said coil section is located radially farther on the outside, with a coil section 56 of the respective other coil bundle 55, which latter coil section is located radially farther on the inside.

Embodiments in which the coils 45 differ from each other by different heat transfer capacities will now be explained as examples with reference to FIGS. 8 and 9. These embodiments may be combined quasi as desired with the embodiments described above and to be described below.

Figure 8:
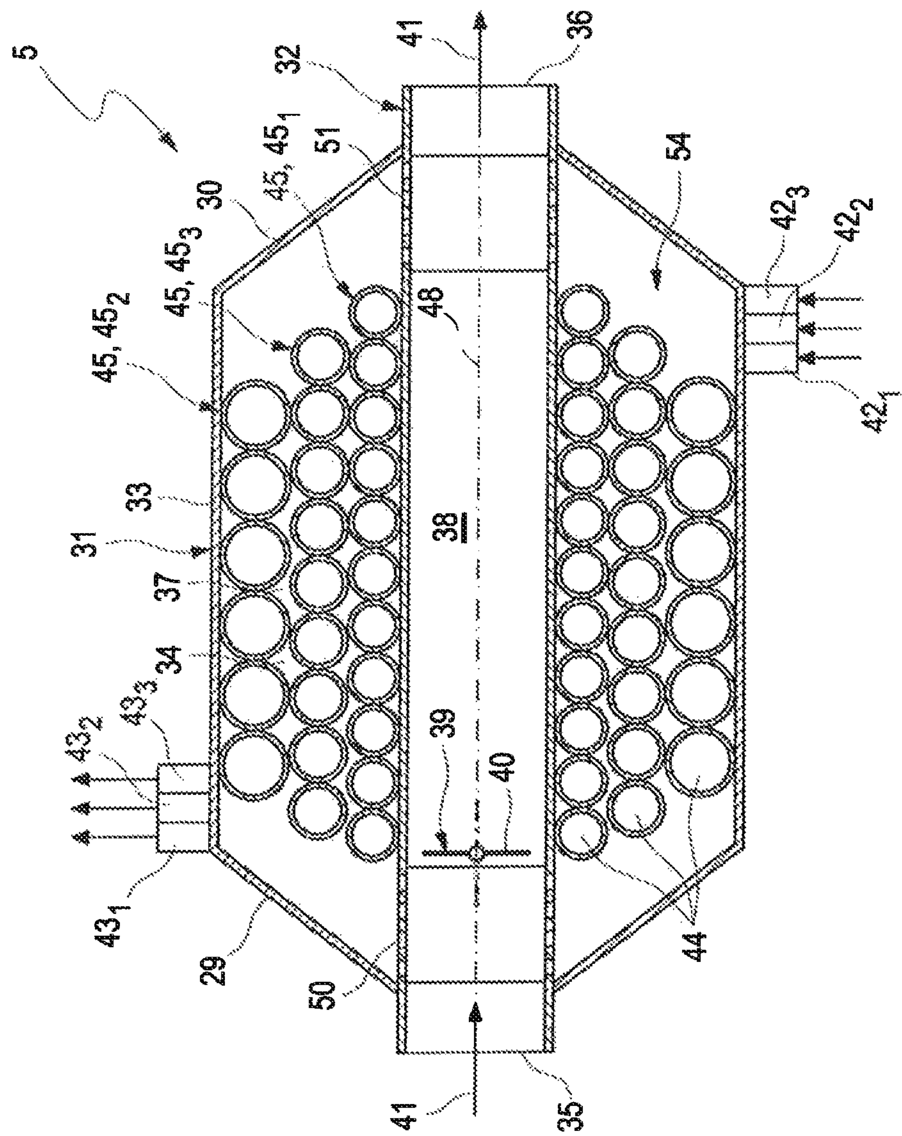
FIG. 8 is a highly simplified longitudinal sectional view through the heat exchanger in one of other embodiments.

FIG. 8 shows, for example, an embodiment in which the individual coils 45 differ from each other by different cross sections through which flow is possible. For example, the coils 45 shown in FIG. 8 thus have an increasing cross section through which flow is possible with increasing radial distance from tube 32. The cross sections through which flow is possible are constant within the corresponding coil 45 and within the corresponding coil section 56. According to FIG. 8, the inner coil $\mathbf{45}_1$ has the smallest cross section through which flow is possible, whereas the outer coil $\mathbf{45}_2$ has the largest cross section through which flow is possible. The middle coil $\mathbf{45}_3$ has a medium cross section through which flow is possible. Furthermore, provisions are made in the embodiments according to FIGS. 8 and 9 for the coils 45 to differ from one another by different numbers of loops 49. As can be recognized, the coils 45 or coil sections 56 arranged farther outside have a smaller number of loops 49 than the coils 45 or coil sections 56 arranged farther inside. For example, the inner coil $\mathbf{45}_1$ thus has the greatest number of loops, while the outer coil $\mathbf{45}_2$ has the smallest number of loops. Coil $\mathbf{45}_3$ arranged in the middle has a medium number of loops.

Other measures, which affect the heat transfer capacity of the coils 45, are, for example, the use of different materials for the coils 45 and for the spiral tubes 46 and the cooling fins 47. Furthermore, the cooling fins 47 may also differ from one another in their size and/or in the density with which they are arranged. The use of different materials leads to different coefficients of thermal conductivity. Said measures may be combined with one another as desired. The goal of the different coefficients of thermal conductivity within the different coils 45 is the most homogeneous heat transfer possible from the primary medium to the secondary medium.

All coils 45 are arranged exclusively radially one over the other in the embodiment shown in FIG. 8 as well as in the variants according to FIGS. 3 through 5 and 7. As a consequence, loops 49 that are axially adjacent to one another in the same radial position belong to the same coil 45 and to the same coil section 56 insofar as the coils 45 are divided into coil bundles 55. The coil array 54 that is a three-layer arrangement in radial direction also comprises now only three coils 45.

Figure 9:
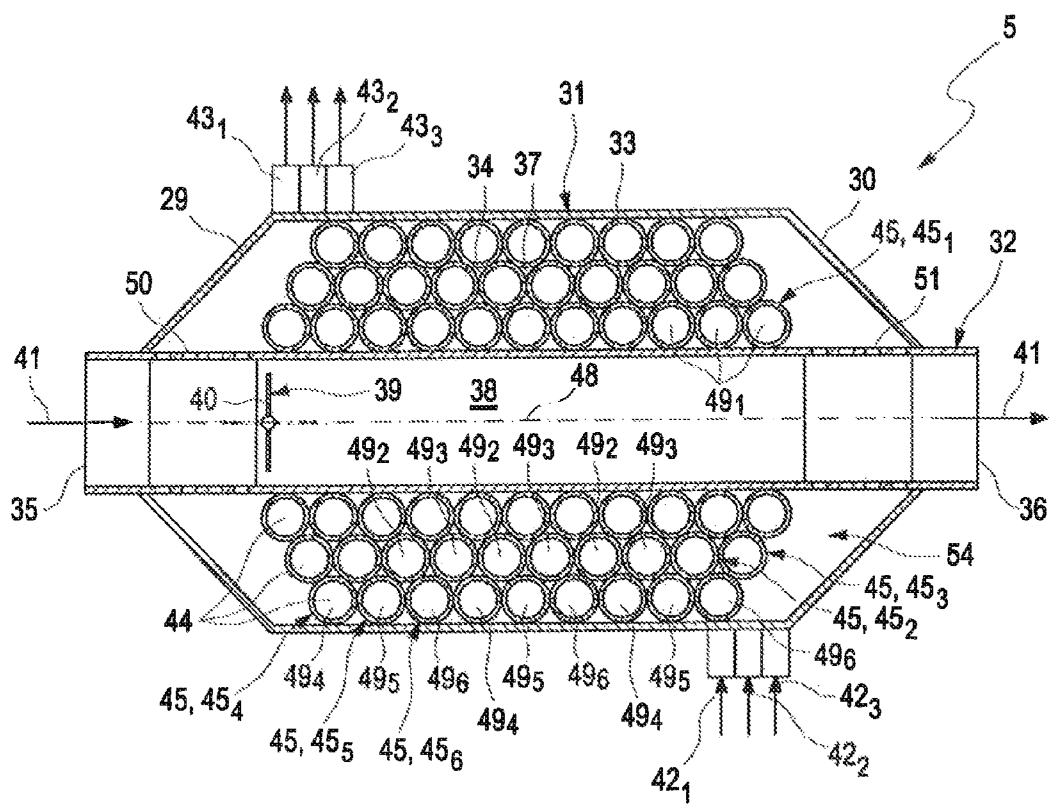
FIG. 9 is a highly simplified longitudinal sectional view through the heat exchanger in another of other embodiments.

Contrary to this, FIG. 9 shows an embodiment in which the coil array 54 that is a three-layer arrangement in the radial direction comprises more than three coils 45, namely, six coils 45. A first coil $45_1$ is located radially inside, i.e., in the inner position. All loops 49 of this first coil $45_1$ are now first loops $49_1$, which are axially adjacent to each other. A second coil $45_2$ and a third coil $45_3$, which have second and third loops $49_2$ and $49_3$, which alternate with one another in the axial direction, are located in the middle position. The two coils $45_2$ and $45_3$ are arranged axially intertwined in one another in the manner of a double coil. The second loops $49_2$ and third loops $49_3$ are correspondingly arranged axially alternatingly next to each other. As many as three coils 45 are even arranged in the outer position in the example according to FIG. 9, namely, a fourth coil $45_4$, a fifth coil $45_5$ and a sixth coil $45_6$. These three coils $45_4$, $45_5$, $45_6$ are arranged axially one in the other in the manner of a triple coil or multiple coil, such that fourth loops $49_4$, fifth loops $49_5$ and sixth loops $49_6$ are arranged axially next to each other and alternate regularly with one another.

Figure 10:
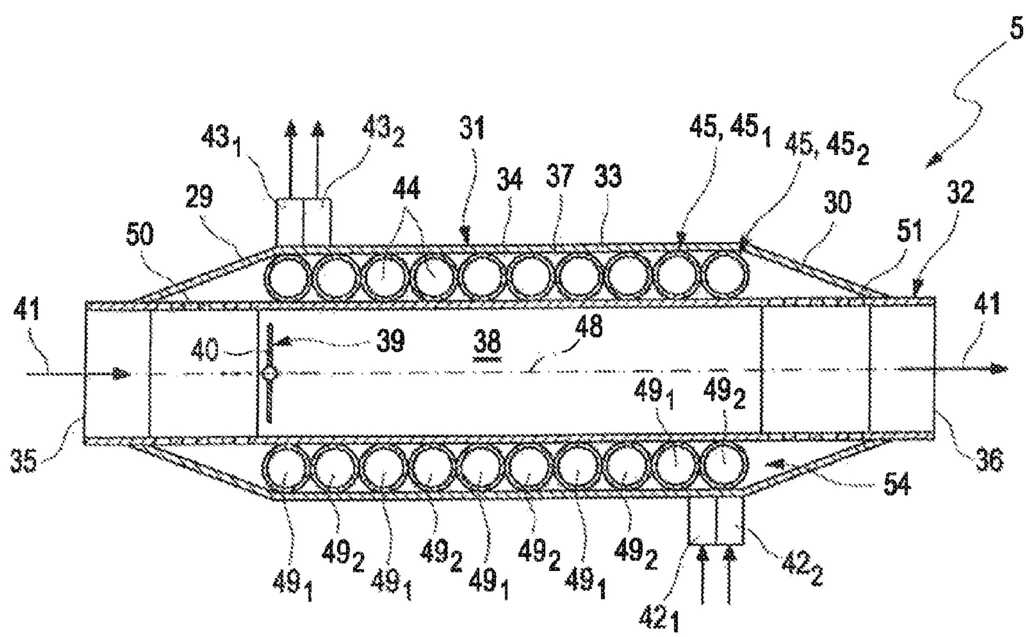
FIG. 10 is a simplified longitudinal sectional view through the heat exchanger in another embodiment.

FIG. 10 shows an embodiment in which a radially one-layer coil array 54 is provided, wherein the two coils 45 shown are arranged in the ring channel 34 axially one in the other, so that the loops 49 of different coils are located axially next to each other here as well. Since only two coils 45 are provided here, the coil array 54 has the shape of a double coil. Since all coils 45 in the ring channel are axially intertwined in one another here, all loops 49 of all coils 45 are in the same radial position, and they are directly adjacent to both tube 32 and jacket 33.

The phrase "directly adjacent" is defined in this connection such that no additional loops, coil sections or coils are arranged between the respective loops 49 and the respective coil 45 and the respective coil section 56, while contacting with the tube 32 and with the jacket 33 is not necessary. Provisions may rather even be made for the inner loops 49 to be in contact with tube 32 via a thermal insulator. In addition or as an alternative, the outer loops 49 may be in contact with jacket 33 via a thermal insulator. An analogous statement will then apply to the one-layer configuration according to FIGS. 10 and 13. In addition or as an alternative to an insulation located on the outside, a mount may be provided, which is supported at jacket 33, on the one hand, and at the corresponding coil 45 or at the coil array 54, on the other hand, in order to fix axially the coil 45 and the coil array 54 in jacket 33. The mount may be especially advantageously a thermally insulating mount, e.g., in the form of a mounting mat. An insulation 63 located on the outside and a mount 64 can be recognized in FIG. 14.

Figure 11:
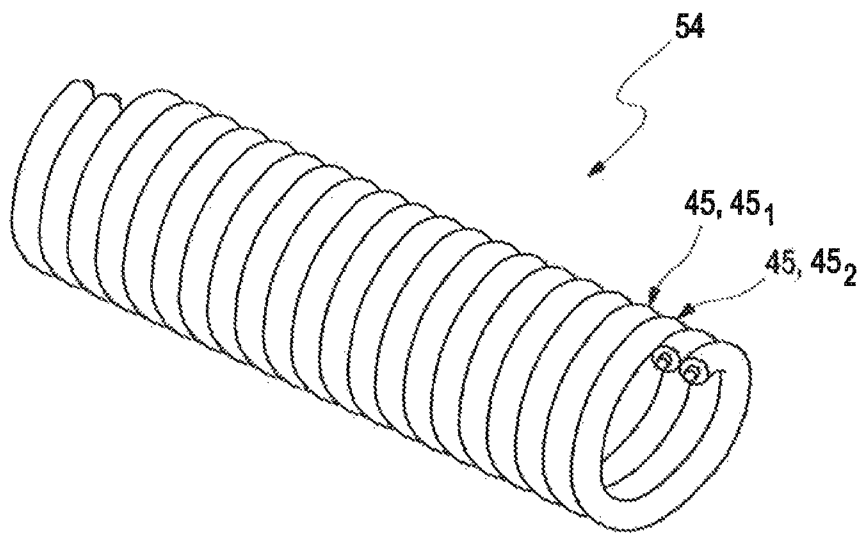
FIG. 11 is an isometric view of a coil array of the heat exchanger from FIG. 10.
Figure 12:
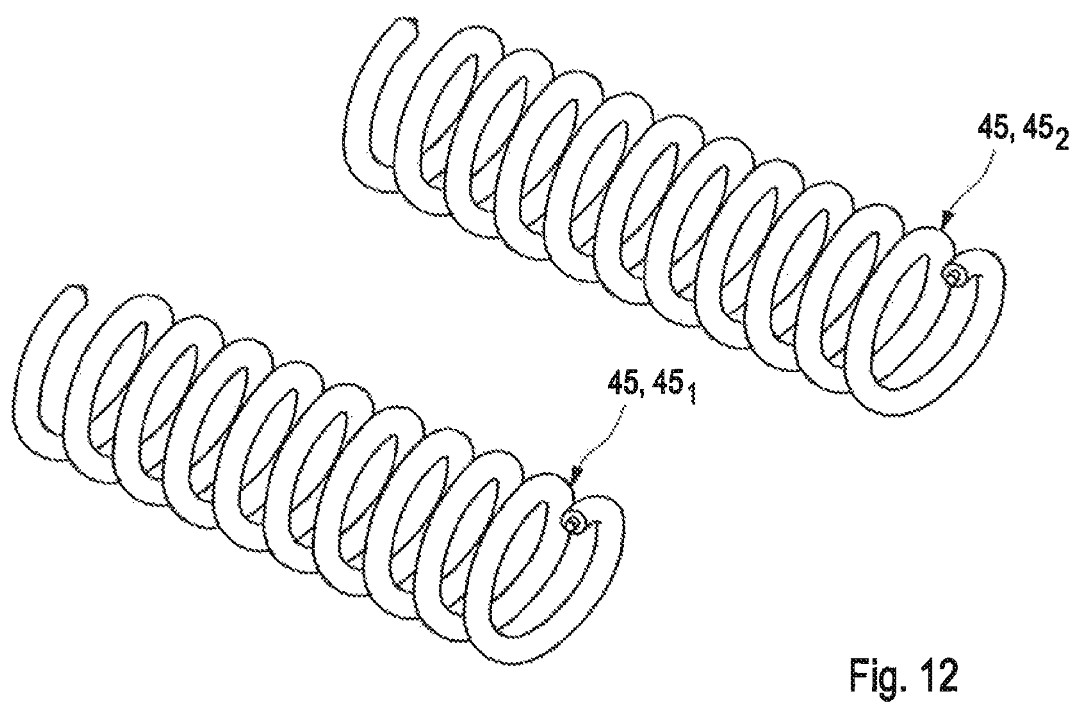
FIG. 12 is an isometric exploded view of the coil array from FIG. 11.

According to FIGS. 11 and 12, the two coils 45 may be arranged axially intertwined in one another according to a double coil. The individual coils 45 may have an identical design here.

Figure 13:
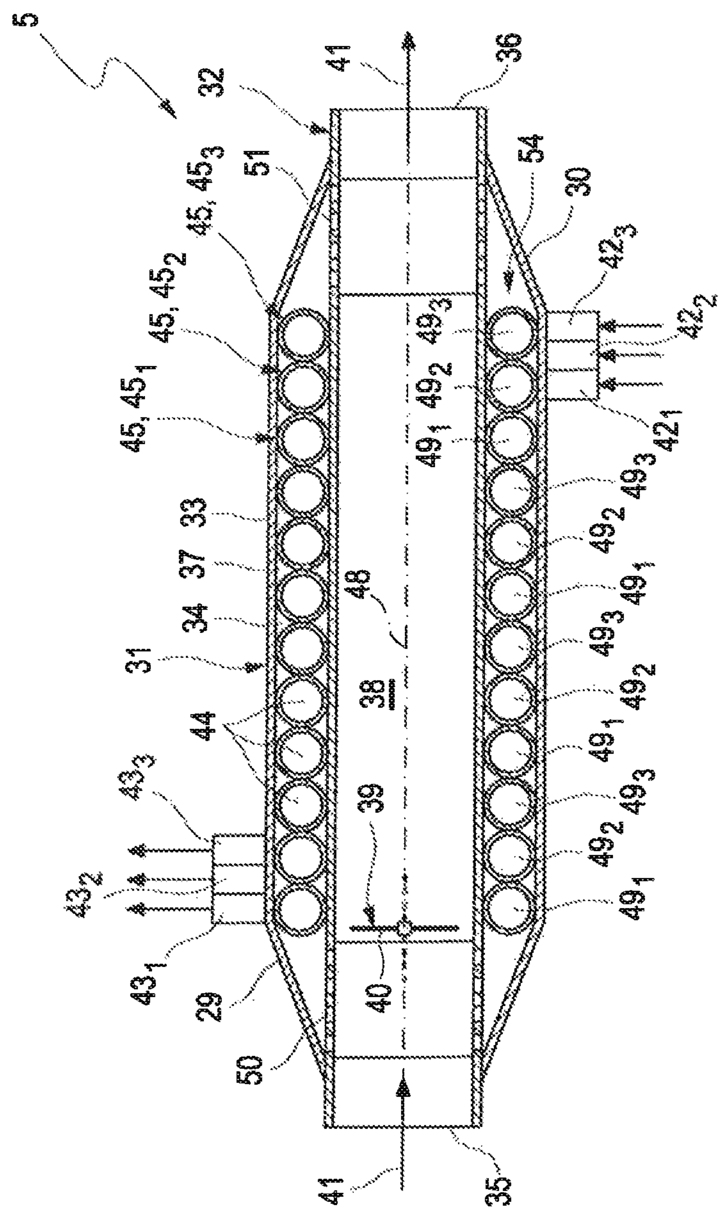
FIG. 13 is a simplified longitudinal sectional view of the heat exchanger in another embodiment.

FIG. 13 shows a variant of the heat exchanger from FIG. 10, in which the coil array 54 comprises, purely as an example, not only two coils 45, but also three coils 45, which are arranged axially intertwined in one another in the manner of a triple coil, so that the loops 49 of different coils 45 are located axially next to each other here as well.

Figure 14:
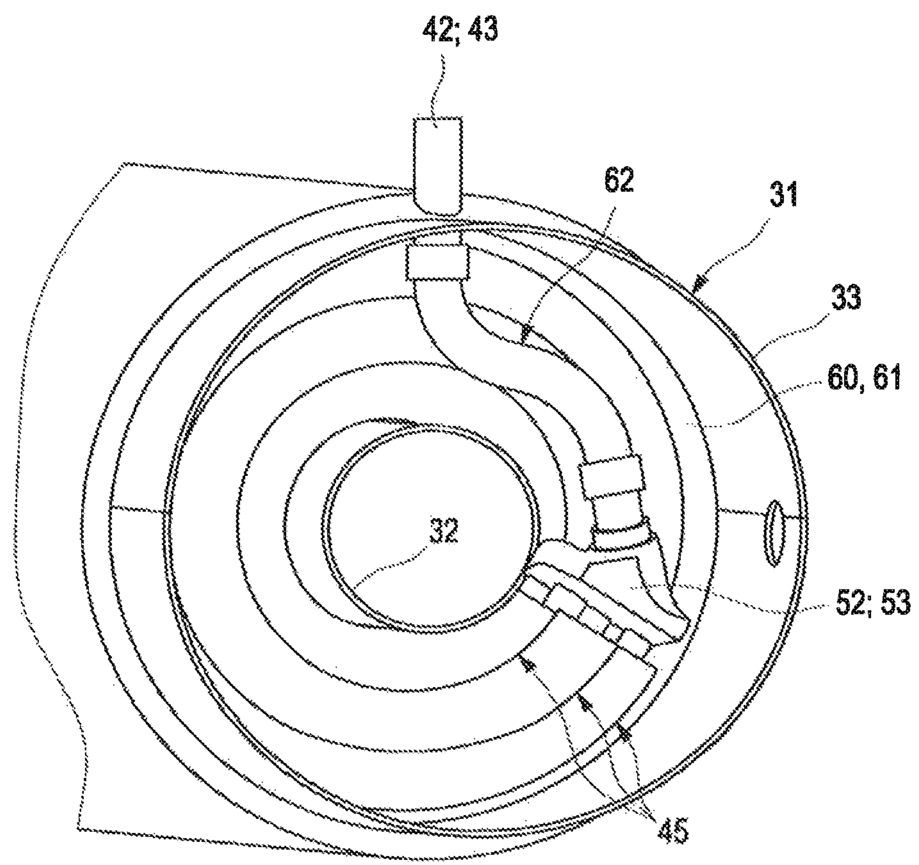
FIG. 14 is an isometric sectional view of the heat exchanger in the area of an uncoupling element.

Corresponding to FIG. 14, a fluidic connection of the respective coil 45 with the housing-side secondary port, i.e., with the secondary inlet 42 or with the secondary outlet 43, is not brought about directly according to a preferred embodiment, but via an uncoupling element 62, i.e., indirectly. The respective uncoupling element 62 is arranged in the interior of housing 31. It is movable and flexible and can compensate relative motions between the respective coil 45 and housing 31 or jacket 33. Such relative motions may occur, for example, because of different coefficients of thermal expansion of the jacket 33 and of the corresponding coil 45. Uncoupling element 62 may be configured, for example, as a metal corrugated hose or spiral wound metal hose. It may have a radially one-layer or multilayer design. It may have an elastic protective layer, which covers the corrugated structure of the corrugated hose. Such a protective layer may be designed, for example, as a clip. In the example according to FIG. 14, uncoupling element 62 is fluidically connected at one end with the respective secondary port 42, 52 and at the other end with a collector element 53, which is in turn connected fluidically, purely as an example in FIG. 14, with three coils 45.

While specific embodiments of the invention have been shown and described in detail to illustrate the application of the principles of the invention, it will be understood that the invention may be embodied otherwise without departing from such principles.

What is claimed is:

1. A heat exchanger comprising:

a tube;

a housing with a jacket surrounding the tube and forming a ring channel;

a primary inlet and a primary outlet, which are connected with one another fluidically via a primary path carrying a primary medium through the ring channel and via a bypass path carrying the primary medium through the tube;

a control device controlling a flow of the primary medium through the primary path and the bypass path; and a secondary inlet and a secondary outlet, which are connected to one another fluidically via at least two secondary paths for carrying a secondary medium, wherein the primary path is coupled with the secondary paths in a heat-transferring manner with the media separated.

2. A heat exchanger in accordance with claim 1, wherein the secondary paths comprises at least two coils arranged in the ring channel, the two coils being wound helically around the tube.

3. A heat exchanger in accordance with claim 2, wherein each coil comprises a spiral tube, which carries the secondary medium on the inside and has cooling fins exposed to the primary medium on the outside.

4. A heat exchanger in accordance with claim 2, wherein the at least two coils are arranged in the ring channel radially one over the other.

5. A heat exchanger in accordance with claim 4, wherein:

the at least two coils each form at least two axially adjacent coil bundles, each coil bundle having a coil section comprising a plurality of loops;

a radial position of a loop of the respective coil section within the same coil bundle is the same; and a radial position of the loops of the same coils are different in the adjacent coil bundles.

6. A heat exchanger in accordance with claim 5, wherein: with a number of coils n, at least n coil bundles are provided with n different radial positions for a loop; and the loops of the coil sections of each coil assume every possible radial position at least once.

7. A heat exchanger in accordance with claim 5, wherein a connection tube fluidically connects a coil section of one coil bundle, which said coil section is located radially farther inside, with a coil section of the other coil bundle, which latter coil section is located radially farther outside, the connection tube being provided for each coil between adjacent coil bundles.

8. A heat exchanger in accordance with claim 2, wherein the coils differ from one another by different heat transfer capacities.

9. A heat exchanger in accordance with claim 2, wherein the coils have different cross sections through which flow is possible.

10. A heat exchanger in accordance with claim 2, wherein each of the coils comprise plurality of loops, wherein the coils differ from one another by a difference in a number of loops.

11. A heat exchanger in accordance with claim 3, wherein the coils differ from one another by at least one of a difference in the size of the cooling fins and a difference in a number of cooling fins per unit of length and a different geometry of the cooling fins and a different material of the cooling fins.

12. A heat exchanger in accordance with claim 2, wherein the coils differ from one another by being formed of different materials.

13. A heat exchanger in accordance with claim 4, wherein all coils are arranged radially one over another.

14. A heat exchanger in accordance with claim 4, wherein at least two coils are arranged axially one in the other at least in a position that is radially farther outside, so that loops of different coils are arranged axially next to one another.

15. A heat exchanger in accordance with claim 2, wherein at least two coils in the ring channel are arranged axially one in the other, so that loops of different coils are arranged axially next to one another.

16. A heat exchanger in accordance with claim 15, wherein all coils in the ring channel are arranged axially one in the other.

17. A heat exchanger in accordance with claim 1, wherein at least one coil is connected fluidically with the secondary inlet or with the secondary outlet via an uncoupling element.

18. A device comprising:

an internal combustion engine comprising combustion chambers, a fresh air feed unit for feeding fresh air to the combustion chambers and an exhaust system for removing exhaust gas from the combustion chambers and at least one of an exhaust gas-recirculating unit recirculating exhaust gas from the exhaust system to the fresh air feed unit and no exhaust gas-recirculating unit recirculating exhaust gas from the exhaust system to the fresh air feed unit;

a waste heat utilization unit with a waste heat utilization circuit in which a working medium circulates, downstream therefrom an evaporator for evaporating the working medium, an expansion engine for expanding the working medium, downstream therefrom a condenser for condensing the working medium and downstream therefrom a feed means for driving the working medium in the waste heat utilization circuit; and a heat exchanger comprising a tube, a housing with a jacket surrounding the tube and forming a ring channel, a primary inlet and a primary outlet, which are connected with one another fluidically via a primary path carrying a primary medium through the ring channel and via a bypass path carrying the primary medium through the tube, a control device controlling a flow of the primary medium through the primary path and the bypass path and a secondary inlet and a secondary outlet, which are connected to one another fluidically via at least two secondary paths for carrying a secondary medium, wherein the primary path is coupled with the secondary paths in a heat-transferring manner with the media separated, wherein:

the primary path is integrated into the exhaust system or into the exhaust gas-recirculating unit, whereby the exhaust gas or the recirculated exhaust gas forms the primary medium; and the secondary paths are integrated into the waste heat utilization circuit, whereby the working medium forms the secondary medium.

19. A device in accordance with claim 18, wherein the secondary paths comprises at least two coils arranged in the ring channel, the two coils being wound helically around the tube.

20. A device comprising:

an internal combustion engine comprising combustion chambers, a fresh air feed unit feeding fresh air to combustion chambers. an exhaust system for removing exhaust gas from the combustion chambers and at least one of an exhaust gas-recirculating unit recirculating exhaust gas from the exhaust system to the fresh air feed unit and no exhaust gas-recirculating unit recirculating exhaust gas from the exhaust system to the fresh air feed unit;

a cooling circuit in which a cooling medium circulates;

a heat exchanger comprising a tube, a housing with a jacket surrounding the tube and forming a ring channel, a primary inlet and a primary outlet, which are connected with one another fluidically via a primary path carrying a primary medium through the ring channel and via a bypass path carrying the primary medium through the tube, a control device controlling a flow of the primary medium through the primary path and the bypass path and a secondary inlet and a secondary outlet, which are connected to one another fluidically via at least two secondary paths for carrying a secondary medium, wherein the primary path is coupled with the secondary paths in a heat-transferring manner with the media separated, wherein:

the primary path is integrated into the exhaust system or into the exhaust gas-recirculating unit, whereby the exhaust gas or the recirculated exhaust gas forms the primary medium; and the secondary paths are integrated into the cooling circuit, whereby the cooling medium forms the secondary medium.

21. A device in accordance with claim 20, wherein the secondary paths comprises at least two coils arranged in the ring channel, the two coils being wound helically around the tube.

* * * * *